United States Patent
Chen et al.

(10) Patent No.: US 10,320,766 B2
(45) Date of Patent: Jun. 11, 2019

(54) WIRELESS NETWORK ACCESS

(71) Applicant: GOOGLE LLC, Mountain View, CA (US)

(72) Inventors: Kevin Tien Chen, Menlo Park, CA (US); Stephen Uhler, Los Altos, CA (US); Rapheal Kaplan, San Francisco, CA (US); Ian Loic McKellar, Alameda, CA (US); Olga Irzak, Mountain View, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 14/944,165

(22) Filed: Nov. 17, 2015

(65) Prior Publication Data

US 2017/0142086 A1    May 18, 2017

(51) Int. Cl.
| | |
|---|---|
| H04L 29/06 | (2006.01) |
| H04W 8/00 | (2009.01) |
| H04L 29/08 | (2006.01) |
| H04W 76/15 | (2018.01) |
| H04W 12/08 | (2009.01) |

(52) U.S. Cl.
CPC .......... *H04L 63/08* (2013.01); *H04L 63/102* (2013.01); *H04L 63/18* (2013.01); *H04L 67/10* (2013.01); *H04W 8/005* (2013.01); *H04W 12/08* (2013.01); *H04W 76/15* (2018.02)

(58) Field of Classification Search
CPC ....... H04L 63/08; H04L 63/102; H04L 63/18; H04L 67/10; H04W 76/025; H04W 8/005
See application file for complete search history.

(56) References Cited

U.S. PATENT DOCUMENTS

| | | |
|---|---|---|
| 7,254,119 B2 | 8/2007 | Jiang et al. |
| 7,411,911 B2 | 8/2008 | Huotari et al. |
| 8,332,914 B2 | 12/2012 | Buddhikot et al. |
| 8,428,036 B2 | 4/2013 | Herscovici et al. |
| 8,522,315 B2 | 8/2013 | Zhang et al. |
| 8,544,072 B1 | 9/2013 | Masone et al. |

(Continued)

FOREIGN PATENT DOCUMENTS

| | | |
|---|---|---|
| CN | 102378175 | 3/2012 |
| CN | 103416086 | 11/2013 |

(Continued)

OTHER PUBLICATIONS

"Wi-Fi Certified Passpoint Architecture for Public Access," Aruba Networks, 2011, www.arubanetworks.com/whitepapers.

(Continued)

*Primary Examiner* — Hee K Song
(74) *Attorney, Agent, or Firm* — Colby Nipper

(57) ABSTRACT

A system and machine-implemented method of wireless network access are provided. First network credentials for a first wireless network hosted by a wireless-enabled device are received from a server. A first network connection with the wireless-enabled device in the first wireless network is established based on the first network credentials. Second network credentials for a second wireless network are provided to the wireless-enabled device via the first network connection. A second network connection with the wireless-enabled device in the second wireless network is established based on the second network credentials.

25 Claims, 5 Drawing Sheets

(56) References Cited

U.S. PATENT DOCUMENTS

| | | | |
|---|---|---|---|
| 8,782,741 | B1 | 7/2014 | L'Heureux et al. |
| 9,055,062 | B1 | 6/2015 | Huang et al. |
| 9,143,940 | B2* | 9/2015 | Fukushima ............ H04W 12/04 |
| 9,226,155 | B2 | 12/2015 | Dabbiere et al. |
| 9,742,775 | B2 | 8/2017 | Huang et al. |
| 10,237,275 | B2 | 3/2019 | Huang et al. |
| 2004/0181692 | A1 | 9/2004 | Wild et al. |
| 2005/0114496 | A1 | 5/2005 | Fang et al. |
| 2006/0133319 | A1 | 6/2006 | Kant |
| 2007/0021116 | A1 | 1/2007 | Okita et al. |
| 2007/0060105 | A1 | 3/2007 | Batta |
| 2007/0147318 | A1* | 6/2007 | Ross .................... H04L 63/104 370/338 |
| 2009/0070412 | A1 | 3/2009 | D'Angelo et al. |
| 2009/0187983 | A1 | 7/2009 | Zerfos et al. |
| 2010/0080202 | A1* | 4/2010 | Hanson ............... H04L 63/0853 370/338 |
| 2010/0125903 | A1 | 5/2010 | Devarajan et al. |
| 2010/0182983 | A1 | 7/2010 | Herscovici et al. |
| 2010/0293250 | A1 | 11/2010 | Ankaiah et al. |
| 2011/0096678 | A1 | 4/2011 | Ketonen |
| 2012/0110640 | A1 | 5/2012 | Donelson et al. |
| 2012/0135711 | A1 | 5/2012 | Jabara et al. |
| 2012/0210011 | A1 | 8/2012 | Liu et al. |
| 2012/0230221 | A1 | 9/2012 | Radhakrishnan et al. |
| 2012/0233672 | A1 | 9/2012 | Kezys et al. |
| 2012/0233679 | A1* | 9/2012 | Shedrinsky ............ G06F 19/327 726/7 |
| 2012/0254614 | A1 | 10/2012 | Kimura et al. |
| 2013/0065633 | A1 | 3/2013 | Sridhara et al. |
| 2013/0097674 | A1 | 4/2013 | Jindal et al. |
| 2013/0115915 | A1 | 5/2013 | Tipton et al. |
| 2013/0198817 | A1 | 8/2013 | Haddad et al. |
| 2013/0223273 | A1 | 8/2013 | Chang et al. |
| 2013/0223279 | A1 | 8/2013 | Tinnakornsrisuphap et al. |
| 2013/0223308 | A1 | 8/2013 | Chandra et al. |
| 2013/0297662 | A1 | 11/2013 | Sharma et al. |
| 2014/0004832 | A1 | 1/2014 | Dabbiere et al. |
| 2014/0026179 | A1 | 1/2014 | Devarajan et al. |
| 2014/0068705 | A1 | 3/2014 | Chambers et al. |
| 2014/0073288 | A1 | 3/2014 | Velasco |
| 2014/0105007 | A1 | 4/2014 | Pathmasuntharam et al. |
| 2014/0126563 | A1 | 5/2014 | Chen et al. |
| 2014/0135042 | A1 | 5/2014 | Buchheim et al. |
| 2014/0165163 | A1 | 6/2014 | Salkintzis |
| 2014/0194153 | A1 | 7/2014 | Salkintzis |
| 2014/0196126 | A1 | 7/2014 | Peterson et al. |
| 2014/0215583 | A1 | 7/2014 | Ding |
| 2015/0071052 | A1 | 3/2015 | Hershberg et al. |
| 2015/0121481 | A1 | 4/2015 | Venkatanaranappa et al. |
| 2015/0327062 | A1* | 11/2015 | Tatavarty ................ G06F 21/45 726/6 |
| 2016/0006739 | A1 | 1/2016 | Huang |
| 2016/0112980 | A1* | 4/2016 | Pai ........................ H04W 12/08 455/435.1 |
| 2016/0294828 | A1* | 10/2016 | Zakaria ............... H04L 41/0886 |
| 2017/0063968 | A1* | 3/2017 | Kitchen ................ H04L 67/10 |
| 2017/0257257 | A1* | 9/2017 | Dawes .................... H04L 69/18 |
| 2017/0318018 | A1 | 11/2017 | Huang et al. |

FOREIGN PATENT DOCUMENTS

| | | |
|---|---|---|
| CN | 105264821 | 1/2016 |
| EP | 1047228 A2 | 10/2000 |
| EP | 1598984 A2 | 11/2005 |
| EP | 2940930 A1 | 11/2015 |
| EP | 3378211 | 9/2018 |
| WO | 2007/062108 A2 | 5/2007 |
| WO | WO-2013/002770 A1 | 1/2013 |
| WO | 2013/128242 A1 | 9/2013 |
| WO | WO-2015/043649 A1 | 4/2015 |
| WO | 2017087168 | 5/2017 |

OTHER PUBLICATIONS

"How Interworking Works: A Detailed Look at 802.1u and Hotspot 2.0 Mechanism," Ruckus Simply Better Wireless, 2014, www.ruckuswireless.com.

Vollbrecht, et al., "Wireless LAN Access Control and Authentication," Interlink Networks, 2002, www.interlinknetworks.com/whitepapers.

"Cloud Wifi app review: providing a secure platform to save, sync, and share your Wifi," <http://www.appicker.com/review/21889/cloud-wifi-app-review>; Feb. 16, 2015, 6 pages.

"How to set up a 1st gen Nest Protect with the Nest app," <https://nest.com/support/article/How-do-I-connect-my-Nest-Protect-Wi-fi-and-my-Nest>; last updated Jun. 18, 2015, 14 pages.

International Preliminary Report on Patentability dated Jan. 3, 2017, which issued in International Application No. PCT/US2015/037809.

International Search Report and Written Opinion dated Jan. 24, 2017, which issued in International Application No. PCT/US2016/059939.

European Patent Office; European Search Report; Appl. No. 15814969.0; dated Jan. 30, 2018.

European Patent Office; Extended European Search Report; Appl. No. 15812778.7; dated Feb. 13, 2018.

European Patent Office; Extended European Search Report; Appl. No. 15829832.3; dated Mar. 1, 2018.

European Patent Office; European Search Report; Appl. No. 15810011.5; dated Jan. 22, 2018.

"Notice of Allowance", U.S. Appl. No. 15/653,408, dated Oct. 17, 2018, 9 pages.

"Final Office Action", U.S. Appl. No. 14/455,829, dated Jul. 25, 2016, 63 pages.

"Foreign Office Action", European Application No. 16795509.5, dated Jun. 26, 2018, 3 pages.

"International Preliminary Report on Patentability", PCT Application PCT/US2015/037809, dated Jan. 3, 2017, 12 pages.

"International Preliminary Report on Patentability", PCT Application No. PCT/US2016/059939, dated May 22, 2018, 11 pages.

"International Search Report", PCT Application No. PCT/US2016/059939, dated Mar. 20, 2017, 6 pages.

"Non-Final Office Action", U.S. Appl. No. 14/455,873, dated Oct. 23, 2014, 4 pages.

"Non-Final Office Action", U.S. Appl. No. 14/455,829, dated Nov. 16, 2015, 44 pages.

"Non-Final Office Action", U.S. Appl. No. 15/653,408, dated Feb. 7, 2018, 9 pages.

"Non-Final Office Action", U.S. Appl. No. 14/455,829, dated Apr. 8, 2016, 46 pages.

"Notice of Allowance", U.S. Appl. No. 14/455,873, dated Aug. 30, 2018, 7 pages.

"Notice of Allowance", U.S. Appl. No. 14/455,829, dated Jan. 17, 2017, 19 pages.

"Notice of Allowance", U.S. Appl. No. 14/455,829, dated Apr. 18, 2017, 18 pages.

"Search Opinion", European Application No. 20150814969, dated Jan. 30, 2018, 5 pages.

"Search Report", European Application No. 15810011.5, dated Jan. 22, 2018, 9 pages.

"Search Report", European Application No. 15829832.3, dated Jan. 3, 2018, 7 pages.

"Search Report", European Application No. 20150814969, dated Jan. 30, 2018, 2 pages.

"Search Report", European Application No. 15812778.7, dated Feb. 13, 2018, 10 pages.

"Written Opinion", PCT Application No. PCT/US2016/059939, dated Mar. 20, 2017, 10 pages.

"Foreign Office Action", European Application No. 20150829832, dated Jan. 15, 2019, 5 pages.

"Foreign Office Action", European Application No. 15829832.3, dated Feb. 8, 2019, 5 pages.

(56) References Cited

OTHER PUBLICATIONS

"Foreign Office Action", Chinese Application No. 201580035203.7, dated Mar. 4, 2019, 32 pages.

* cited by examiner

WIRELESS NETWORK ACCESS

BACKGROUND

The present disclosure generally relates to providing wireless network access, and in particular, to providing wireless network access to wireless-enabled devices.

Wireless-enabled devices offer many benefits, such as convenience, flexibility and improved user interaction. For example, a user may adjust his home's temperature by adjusting a wireless-enabled thermostat from a remote location. However, the initial setup and configuration of wireless-enabled device is often cumbersome to the user.

SUMMARY

The disclosed subject matter relates to a computer-implemented method. The method comprises receiving, from a server, first network credentials for a first wireless network hosted by a wireless-enabled device. The method further comprises establishing a first network connection with the wireless-enabled device in the first wireless network based on the first network credentials. The method further comprises providing second network credentials for a second wireless network to the wireless-enabled device via the first network connection. In addition, the method comprises establishing a second network connection with the wireless-enabled device in the second wireless network based on the second network credentials.

The disclosed subject matter also relates to a wireless network access system. The system comprises a machine-readable medium encoded with instructions and a processor configured to execute the instructions to perform a process comprising receiving, from a server, first network credentials for a first wireless network hosted by a wireless-enabled device. The process further comprises scanning to detect the wireless-enabled device based on the first network credentials. The process further comprises establishing, upon detecting the wireless enabled device, a first network connection with the wireless-enabled device in the first wireless network based on the first network credentials. The process further comprises providing second network credentials for a second wireless network to the wireless-enabled device via the first network connection. In addition, the process comprises establishing a second network connection with the wireless-enabled device in the second wireless network based on the second network credentials.

The disclosed subject matter also relates to a non-transitory machine-readable medium encoded with instructions that, when executed by a processor, cause the processor to perform a process comprising receiving, from a server, first network credentials for a first wireless network hosted by a wireless-enabled device. The process further comprises establishing a first network connection with the wireless-enabled device in the first wireless network based on the first network credentials. The process further comprises providing second network credentials for a second wireless network to the wireless-enabled device via the first network connection. The process further comprises terminating the first network connection after providing the second network credentials. In addition, the process comprises establishing a second network connection with the wireless-enabled device in the second wireless network based on the second network credentials.

The disclosed subject matter also relates to a computer-implemented method. The method comprises receiving, from a client application, network credentials for a first wireless network hosted by a wireless-enabled device and account credentials for a user account of a cloud-based service. The method further comprises determining a wireless access point affiliated with the user account of the cloud-based service, wherein the wireless access point is configured to provide access to a second wireless network. In addition, the method comprises providing the network credentials for accessing the wireless-enabled device via the first wireless network to the determined wireless access point.

The disclosed subject matter further relates to a non-transitory machine-readable medium encoded with instructions that, when executed by a processor, cause the processor to perform a process comprising receiving, from a client application, encoded network credentials for a first wireless network hosted by a wireless-enabled device and account credentials for a user account of a cloud-based service. The process further comprises verifying and decoding the encoded network credentials. The process further comprises determining a wireless access point affiliated with the user account of the cloud-based service, wherein the wireless access point is configured to provide access to a second wireless network. The process further comprises providing the decoded network credentials for accessing the wireless-enabled device via the first wireless network to the determined wireless access point. The process further comprises generating a registration ticket associated with the user account of the cloud-based system to the wireless access point. The process further comprises sending the registration ticket to the wireless access point. The process further comprises receiving, via the wireless access point, a registration request from the wireless-enabled device based on the registration ticket. In addition, the process comprises registering the wireless-enabled device with the user account of the cloud-based service in response to the registration request.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
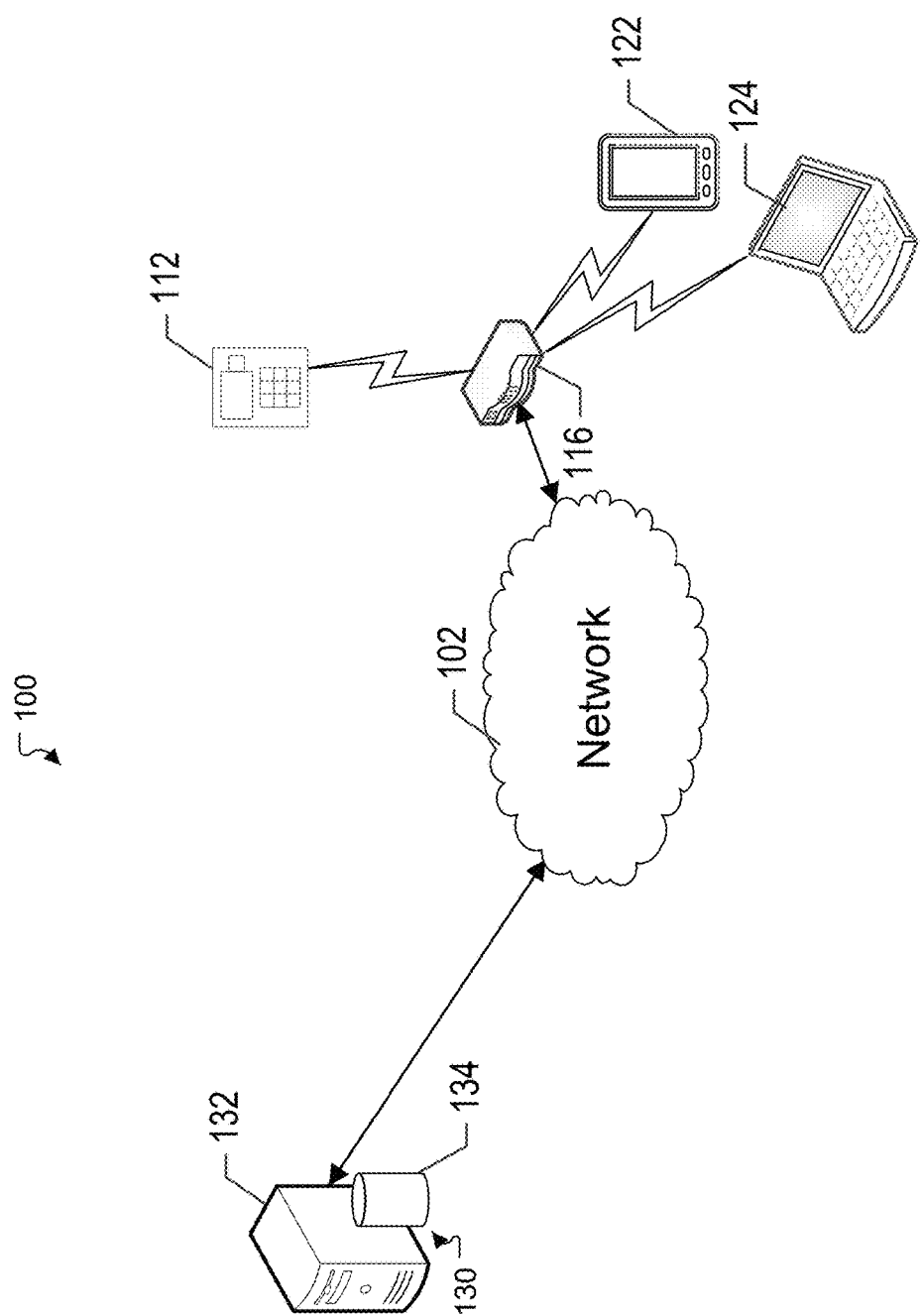
FIG. 1 illustrates an example network environment which provides for wireless network access.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Wireless-enabled devices offer many benefits, such as convenience, flexibility and improved user interaction. For example, a user may adjust his home's temperature by adjusting a wireless-enabled thermostat from a remote location. However, limitations associated with setting up a wireless-enabled device may negatively impact user experience on a variety of levels. For example, setting up a wireless-enabled device may require the wireless-enabled device to act as an access point hosting a provisional wireless network. A client device of the user may need to temporarily break its internet connection in order to connect to the provisional wireless network and setup the wireless-enabled device for a permanent wireless network.

The subject technology provides an improved system for setting up a wireless-enabled device in a local wireless network. In some implementations, encoded network credentials for a first wireless network (e.g., a provisional network) associated with the wireless-enabled device may be provided by a user via a client application (e.g., web application or a standalone client application) running on a client device. The encoded network credentials may be obtained via a mechanism that indicates physical proximity and/or control of the wireless-enabled device by the user. For example, the wireless-enabled device may broadcast the encoded network credentials using a short-range wireless protocol or transmit the encoded network credentials over a physical connection to the client device. Alternatively, or in addition, the encoded network credentials may be obtained by scanning a code displayed on the wireless-enabled device. The client application may send the encoded network credentials for the first wireless network associated with the wireless-enabled device and account credentials of a user account associated with the user for a cloud-based service to a server.

The server may receive the encoded network credentials for the first wireless network associated with the wireless-enabled device and the account credentials for the user account of the cloud-based service. The server may determine a wireless access point associated with the user account of the cloud-based service, for example, based on an association of the wireless access point and the user account of the cloud-based service. The determined wireless access point may be configured to provide access to a second wireless network. The server may decode the encoded network credentials, for example, into a Service Set Identifier (SSID) and/or a password of the first wireless network. The server may provide the decoded network credentials for accessing the wireless-enabled device via the first wireless network to the determined wireless access point. In addition, the server may provide a registration ticket associated with the user account of the cloud-based system to the determined wireless access point.

The determined wireless access point may receive, from the server, the decoded network credentials for the first wireless network associated with the wireless-enabled device and the registration ticket associated with the user account of the cloud-based service. The determined wireless access point may identify the wireless-enabled device within range and establish a first network connection with the wireless-enabled device via the first wireless network, for example, using the received decoded network credentials. The determined wireless access point may provide network credentials for the second wireless network to the wireless-enabled device via the first network connection. The wireless-enabled device may tear down the first wireless network and send an association request including the network credentials for the second wireless network to the determined wireless access point. Upon receiving the association request, the determined wireless access point may establish a second network connection with the wireless-enabled device via the second wireless network.

The determined wireless access point may provide the registration ticket associated with the user account to the wireless-enabled device via the second wireless network. The wireless-enabled device may send a registration request based on the registration ticket to the server via the second network connection of the determined wireless access point. The server may receive the registration request from the wireless-enabled device and register the wireless-enabled device with the user account of the cloud-based service in response to the registration request. Upon receiving the registration from the server, the determined wireless access point may associate the wireless-enabled device with the user account of the cloud-based service based on the registration request.

FIG. 1 illustrates an example network environment which provides for wireless network access. Network environment 100 includes wireless client devices 122 and 124, wireless access point 116, wireless-enabled device 112, and server 130.

Each of wireless client devices 122, 124 represents various forms of processing devices. Example processing devices include a desktop computer, a laptop computer, a handheld computer, a personal digital assistant (PDA), a cellular telephone, a network appliance, a camera, a smartphone, an enhanced general packet radio service (EGPRS) mobile phone, a media player, a navigation device, an email device, a game console, or a combination of any these data processing devices or other data processing devices. Wireless client devices 122 and 124 may allow a user to access a wireless local area network, such as provided by wireless access point 116, by authenticating credentials of the user with an authentication service, such as provided by server 130.

Wireless-enabled device 112 may include an electronic device with built-in support for wireless network access. Wireless-enabled device 112 may include a variety of devices in an Internet of Things (IoT) network. Wireless-enabled device 112 may have a limited user interface or may not have a user interface for user interaction and control. Wireless-enabled device 112 may be small in size and may be embedded in a system or device, such as a sensor embedded in a system including thermostat systems, washer/dryers, automobiles and any other systems. Wireless-enabled device 112 may include temperature sensors, video cameras, audio recorders, motion sensors, humidity sensors, smoke detectors, various gas sensors, radiation monitors, security sensors, such as door and/or window sensors, biometric sensors, wearable devices/sensors, implantable devices/sensors, embedded devices/sensors and/or any other devices/sensors. Wireless-enabled device 112 may be a smart sensor that includes, but is not limited to, processing logic such as one or more controllers or processors, memory, and communication interfaces. Wireless-enabled device 112 may be action devices, such as actuators, alarm devices, automated devices, or any other devices that are capable of performing one or more actions.

Wireless access point 116 is a network device and can include network devices, such as a hub, a router, a switch, and/or a bridge. The network device may be a combination of network devices, such as a wireless router that includes a router, a switch, and a wireless access point. The network device can be a wireless router with a built in modem (e.g., cable modem) for example. Other network devices can also be utilized in implementations of the subject technology.

Server 130 can include one or more computing devices 132 and one or more computer-readable storage devices 134 (e.g., data stores). Server 130 may be a system or device having a processor, a memory, and communications capability for providing content and/or services to client devices. Server 130 can be a single computing device, for example, a computer server. In other embodiments, server 130 can represent more than one computing device working together to perform the actions of a server computer (e.g., cloud computing). Further, server 130 can represent various forms of servers including, but not limited to an application server, a proxy server, a network server, an authentication server, an electronic messaging server, a content server, etc., accessible to the wireless client devices 122, 124. Server 130 may be an authentication server that provides user authentication services for wireless local area network access. Server 130 may host services including cloud-based services. A cloud-based service may include a service provided by cloud computing resources, such as, but not limited to, server 130 and/or other computing resources accessible via one or more networks (e.g., network 102). A cloud-based service may require authentication of a user account for access via a cloud-based application, such as a web-based personal portal or a web-based email application.

A user may interact with content and/or services hosted by server 130, through a client application installed at wireless client device 122, such as a web browser application and/or a standalone client application. Communication between wireless client device 122 and server 130 may be facilitated through network 102.

Wireless client devices 122 and 124 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, Near Field Communication (NFC), or other such transceiver.

Wireless-enabled device 112 may communicate with wireless client devices 122, 124, and/or wireless access point 116 through a communication interface. The communication interface may be a network interface. The network interface may include an interface of a local area network ("LAN"), a wide area network ("WAN"), or an Intranet, or a network of networks, for example, the Internet. The network interface may include a wireless network interface, such as using a Bluetooth, WiFi, NFC, or other such transceiver. The communication interface may be an input and/or output device interface, such as an audio port, an interface for a printer and a display device, for example, a liquid crystal display (LCD).

Network 102 can include, for example, any one or more of a campus area network (CAN), a metropolitan area network (MAN), a wide area network (WAN), a broadband network (BBN), the Internet, and the like. Further, network 102 can include, but is not limited to, any one or more of the following network topologies, including a bus network, a star network, a ring network, a mesh network, a star-bus network, tree or hierarchical network, and the like.

Communication between clients (e.g., wireless client devices 122, 124) and server (e.g., server 130) can occur via a virtual private network (VPN), Secure Shell (SSH) tunnel, Transport Layer Security (TLS) tunnel, Extensible Authentication Protocol (EAP)-TLS based tunnel, or other secure network connection. Network 102 may include one or more network devices that facilitate communications between wireless client devices 122, 124, wireless-enabled device 112, and server 130, such as switch devices, router devices, relay devices, etc., and/or may include one or more servers.

Wireless client devices 122, 124 and wireless-enabled device 112 may associate with wireless access point 116 to access a wireless local area network using WiFi standards (e.g., IEEE 802.11). The wireless local area network can include, but is not limited to, a computer network that covers a limited geographic area (e.g., a home, school, computer laboratory, or office building) using a wireless distribution method (e.g., spread-spectrum or OFDM).

Network environment 100 may be, or may include, one or more of a bus network, a star network, a ring network, a relay network, a mesh network, a star-bus network, a tree or hierarchical network, and the like.

As noted above, wireless-enabled device 112 may have a limited user interface or may not have a user interface, which may not allow a user to directly setup wireless-enabled device 112. Wireless-enabled device 112 may connect to wireless access point 116 for setup and configuration. A user may provide network credentials of the wireless local area network to wireless-enabled device 112 to access the wireless local area network, for example, via wireless client device 122. Wireless client device 122 may need to break its wireless connection with wireless access point 116 to provide network credentials of the wireless local area network to wireless-enabled device 112.

Figure 2:
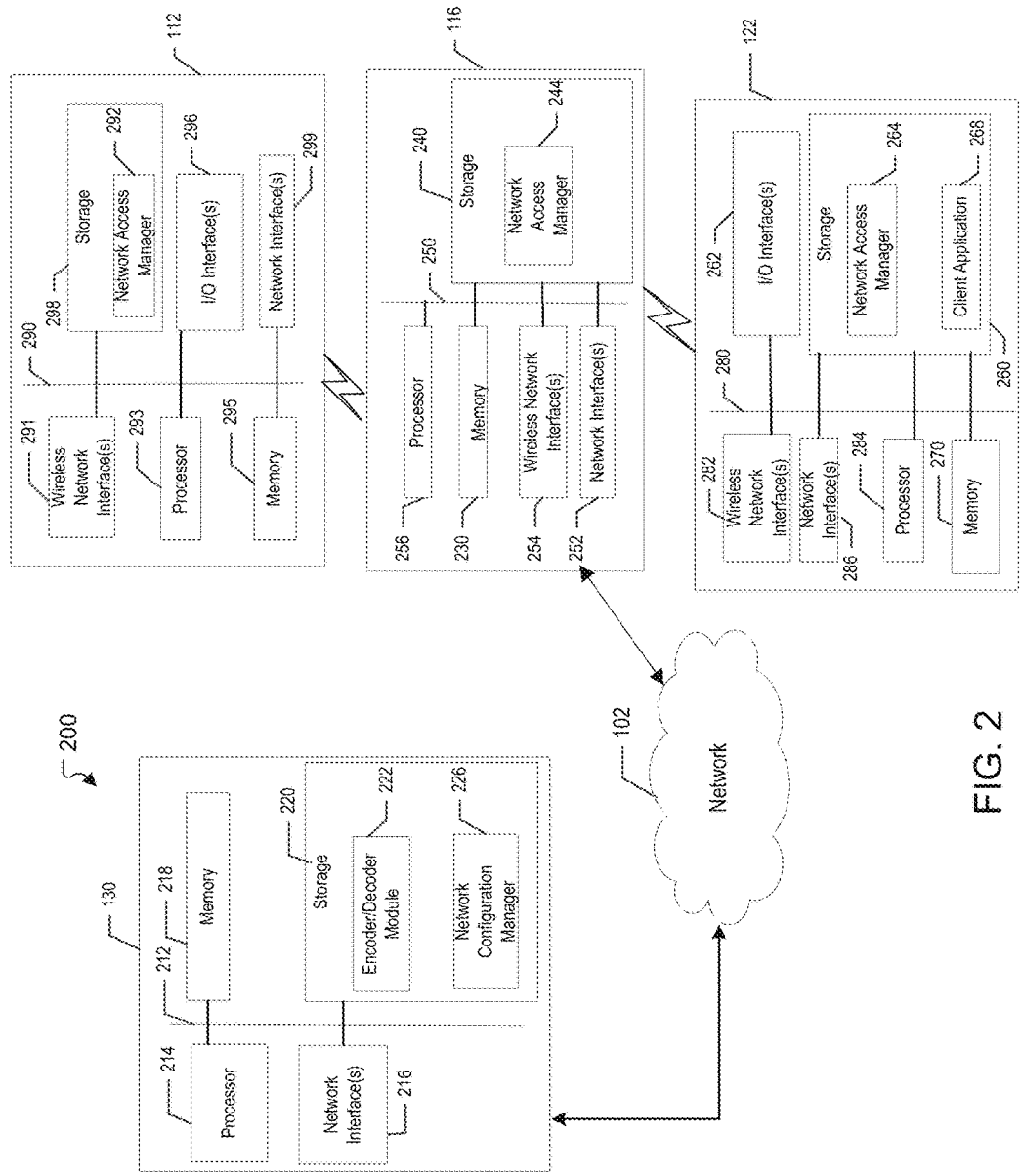
FIG. 2 is a block diagram illustrating an example wireless client device, server, wireless-enabled device, and wireless access point from the network environment of FIG. 1 according to certain aspects of the disclosure.

FIG. 2 is a block diagram illustrating an example wireless client device 122, server 130, wireless-enabled device 112 and wireless access point 116 from the network environment of FIG. 1 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer compo- Wireless client device 122 includes memory 270, processor 284, storage 260, bus 280, one or more network interfaces 286, one or more wireless network interfaces 282, and one or more input/output (I/O) interfaces 262. Wireless client device 122 may establish a network connection with wireless access point 116 via one or more wireless network interfaces.

Memory 270 may include a dynamic random-access memory (DRAM) and/or a read-only memory (ROM). Memory 270 may store data and instructions that may be retrieved by processor 284. Storage 260 may include a non-volatile read-and-write memory that stores data and instructions, even when wireless client device 122 is off, that may be retrieved by the processor 284. Storage 260 may include network access manager 264 and client application 268. Storage 206 may include magnetic, solid state or optical media.

From memory 270 and/or storage 260, processor 284 may retrieve instructions to execute and data to process in order to perform the processes of the subject disclosure. Processor 284 can be a single processor, a multi-core processor or multiple processors. Each of network access manager 264 and client application 268 may include instructions that, when executed by processor 284, cause processor 284 to perform operations described below.

Network access manager 264 may include instructions to manage wireless connections between wireless client device 122 and a wireless local area network. Network access manager 264 may include instructions to discover wireless access points, send an authentication request for wireless local area network access, identify and select a wireless local area network to access, and associate with a wireless access point to access the wireless local area network. Network access manager 264 may include instructions to discover wireless-enabled devices, and associate with a wireless-enabled device to access a wireless network.

Client application 268 may include a web-based application. The web-based application may be accessed via a browser application. Client application 268 may include a standalone application, such as a native application. The native application is a software application designed to run on an operating system on wireless client device 122. The native application may be free or purchased through an application store and installed on wireless client device 122. Client application 268 may be used for setting up a wireless-enabled device, for example, based on information of the wireless-enabled device and/or user authentication credentials.

A user of wireless client device 122 may provide user authentication credentials, such as for a user account of a cloud-based service associated with the user, via client application 268. Credentials for a user account of a cloud-based service may include a user account name, a user account password, a realm, an email address and/or any item corresponding to the user account of the cloud-based service. Credentials for a user account of a cloud-based service may be used for user account authentication, such as at server 130.

Wireless client device 122 may receive encoded network credentials from wireless-enabled device 112 via one or more mechanisms, such as via a short-range communication protocol. The encoded network credentials may include an encoded SSID and/or password of a provisional wireless network hosted by wireless-enabled device 112. Client application 268 may use or interact with the one or more mechanisms.

Client application 268 may receive encoded network credentials from wireless-enabled device 112 via a short-range communication technology. Client application 268 may initiate a pairing process with wireless-enabled device 112 using Bluetooth wireless technology. Client application 268 may communicate with wireless-enabled device 112 using Bluetooth low energy (LE) wireless technology without pairing needed. A user can confirm the pairing process on wireless-enabled device 112 using a button or inputting a PIN. In some aspects, client application 268 may communicate with wireless-enabled device 112 over WiFi or access network query protocol (ANQP), which is supported by WiFi standards (e.g., IEEE 802.11u). In some aspects, client application 268 may receive encoded network credentials from wireless-enabled device 112 by NFC wireless technology. In some aspect, wireless client device 122 may be connected with wireless client device 122 over an Ethernet connection to receive encoded network credentials from wireless-enabled device 112.

Client application 268 may receive encoded network credentials from wireless-enabled device 112 by obtaining a code associated with wireless-enabled device 112. The code associated with wireless-enabled device 112 may include a Quick Response (QR) code, a barcode, and/or PIN. A user may provide the code associated with wireless-enabled device 112 via client application 268.

Client application 268 may receive encoded network credentials from wireless-enabled device 112 by letting a user to connect a cable to wireless-enabled device 112 as a pairing process, such as via an audio jack interface. Wireless client device 122 may pair with wireless-enabled device 112 over the cable to indicate a physical proximity with wireless-enabled device 112. The cable can be removed after the pairing process.

Client application 268 may include a setup application for a USB stick or cable. Client application 268 may include a unique pairing key to pair wireless client device 122 with wireless-enabled device 112 to receive encoded network credentials from wireless-enabled device 112.

A display of wireless client device 122 may assist a user to receive encoded network credentials from wireless-enabled device 112, such as using one or more mechanisms as described above. For example, the display may provide an interface to allow a user of wireless client device 112 sign into a user account of a cloud-based service using one or more device controls.

Client application 268 may receive encoded network credentials from wireless-enabled device 112 in a form of audio signal transmitted by wireless-enabled device 112. Wireless-enabled device 112 may transmit an audio signal via a speaker and may allow wireless client device 122 to receive the audio signal. The audio signal may include a noise, a whisper, a voice, a Dual-Tone Multi-Frequency (DTMF) signal, a touch tone, and/or a musical note. Wireless-enabled device 112 may transmit the audio signal continuously, such as in an inaudible ultrasonic range.

Client application 268 may receive encoded network credentials from wireless-enabled device 112 via a light blinking pairing process, similar to the process of scanning a QR code. Client application 268 may receive encoded network credentials from wireless-enabled device 112 via magnetic compass pairing process, similar to the process of NFC wireless technology.

Wireless network interfaces 282 may include one or more Bluetooth, WiFi, NFC wireless interfaces. One or more network interfaces 286 may include an Ethernet interface. One or more I/O interfaces 262 may include, for example, an audio interface (e.g., speaker), a USB interface, a touch screen interface, a keyboard interface, and/or a display interface for liquid crystal displays (LCD). Wireless client device 122 may communicate with a wireless-enabled device using one or more wireless network interfaces 282, one or more network interfaces 286 and/or one or more I/O interfaces 262 to indicate a physical proximity with the wireless-enabled device.

Wireless access point 116 includes memory 230, processor 256, storage 240, bus 250, one or more wireless network interfaces 254 and one or more network interfaces 252. Wireless access point 116 may establish a network connection with wireless client device 112 via one or more wireless network interfaces 254. Wireless access point 116 may establish a network connection with network 102 via one or more network interfaces 252.

Memory 230 may include a dynamic random-access memory (DRAM) and/or a read-only memory (ROM). Memory 230 may store data and instructions that may be retrieved by processor 256. Storage 240 may include a non-volatile read-and-write memory that stores data and instructions, even when wireless access point 116 is off, that may be retrieved by the processor 256. Storage 240 may include a network access manager 244. For example, storage 240 may include magnetic, solid state or optical media.

From memory 230 and/or storage 240, processor 256 may retrieve instructions to execute and data to process in order to perform the processes of the subject disclosure. Processor 256 can be a single processor, a multi-core processor or multiple processors. Network access manager 244 may include instructions that, when executed by processor 256, cause processor 256 to perform operations described below.

Network access manager 244 may include instructions to manage wireless connections between wireless access point 116 and wireless client devices, such as wireless client device 122. Network access manager 244 may include instructions to broadcast capabilities of association, respond to queries and association requests from wireless client devices and/or wireless-enabled devices, associate with wireless client devices and/or wireless-enabled devices based on network credentials, and grant wireless local area network access.

Network access manager 244 may include instructions to send an advertisement, such as a beacon, about the capabilities of wireless access point 116. Network access manager 244 may include instructions to respond to queries from wireless client device 122 and/or wireless-enabled device 112. Network access manager 244 may include instructions to detect an authentication request from wireless client device 122 and forward the authentication request to server 130. Network access manager 244 may include instructions to detect one or more wireless-enabled device, such as wireless-enabled device 112.

Network access manager 244 may include instructions to grant access to a wireless local area network in response to an association request, such as from wireless client device 122 and/or wireless-enabled device 112. Network access manager 244 may include instructions to associate with wireless client device 122 to provide access to a wireless local area network based on authentication of user account credentials from server 130.

Network access manager 244 may include an identifier that is associated with the wireless access point 116, such as a network identifier including a Basic Service Set Identifier BSSID (e.g., Media Access Control (MAC) address), and/or a SSID. The owner of the wireless access point 116 may register the identifier with a service, for example, an authentication service hosted by server 130. Network access manager 244 may include a routing table with route information about directly connected and remote networks associated with wireless access point 116. The routing table may list the routes to particular network destinations, and in some cases, metrics (e.g., distances) associated with those routes. Wireless access point 116 may search the routing information stored in the routing table to forward a data packet toward its destination network, for example, based on a destination IP address of the data packet. Wireless-enabled device 112 includes memory 295, processor 293, storage 298, bus 290, one or more network interfaces 299, one or more wireless network interfaces 291 and one or more I/O interfaces 296. Wireless-enabled device 112 may establish a network connection with wireless access point 116 via one or more wireless network interfaces.

Memory 295 may include a dynamic random-access memory (DRAM) and/or a read-only memory (ROM). Memory 295 may store data and instructions that may be retrieved by processor 293. Storage 298 may include a non-volatile read-and-write memory that stores data and instructions, even when wireless-enabled device 112 is off, that may be retrieved by the processor 293. Storage 298 may include network access manager 292. Storage 298 may include magnetic, solid state or optical media.

From memory 295 and/or storage 298, processor 293 may retrieve instructions to execute and data to process in order to perform the processes of the subject disclosure. Processor 293 can be a single processor, a multi-core processor or multiple processors. Network access manager 292 may include instructions that, when executed by processor 293, cause processor 293 to perform operations described below.

Network access manager 292 may include instructions to manage wireless connections between wireless-enabled device 112, wireless client device 122 and/or wireless access point 116. Network access manager 292 may include instructions to determine the capabilities of wireless access points, identify and select a wireless local area network to access, and associate with a wireless access point to access the wireless local area network.

Network access manager 292 may include instructions to send an advertisement, such as a beacon, associated with a wireless network provided by wireless-enabled device 112. Network access manager 292 may include instructions to broadcast or send network credentials associated with the wireless network provided by wireless-enabled device 112, such as encoded network credentials. Network access manager 292 may include instructions to respond to queries from wireless client device 122 and/or wireless access point 116. Network access manager 292 may include instructions to determine what kind of network access wireless-enabled device 112 needs, such as based on the type of device, type of application running, and/or type of network traffic associated with wireless-enabled device 112. For example, network access manager 292 may include instructions to determine only limited network access is needed for authentication and/or communication with server 130. Alternatively or in addition, network access manager 292 may include instructions to determine full network access is needed to access one or more servers other than server 130.

Wireless network interfaces 291 may include one or more Bluetooth, WiFi, NFC wireless interfaces. Network interfaces 299 may include an Ethernet interface. I/O interfaces 296 may include, for example, an audio interface (e.g., speaker), a USB interface, a touch screen interface, a keyboard interface, and/or a display interface for liquid crystal displays (LCD). Wireless-enabled device 112 may communicate with a wireless client device using one or more wireless network interfaces 291, network interfaces 299 and/or I/O interfaces 296 to receive encoded network credentials from with the wireless client device.

Server 130 may include memory 218, processor 214, storage 220, bus 212 and one or more network interfaces 216. Server 130 may establish a network connection with network 102 via one or more network interfaces 216.

Memory 218 may include a dynamic random-access memory (DRAM) and/or a read-only memory (ROM). Memory 218 may store data and instructions that may be retrieved by processor 214. Storage 220 may include a non-volatile read-and-write memory that stores data and instructions, even when server 130 is off, that may be retrieved by processor 214. Storage 220 may include encoder/decoder module 222, and network configuration manager 226. For example, storage 220 may include a magnetic, solid state or optical media.

From memory 218 and/or storage 220, processor 214 may retrieve instructions to execute and data to process in order to perform the processes of the subject disclosure. Processor 214 can be a single processor, a multi-core processor or multiple processors. Each of encoder/decoder module 222 and network configuration manager 226 may include instructions that, when executed by processor 214, cause processor 214 to perform operations described below.

As noted above, wireless client device 122 may receive encoded network credentials from wireless-enabled device 112 and send the encoded network credentials to server 130. Encoder/decoder module 222 may include instructions to identify network credentials for a wireless local area network in a lookup table based on the encoded network credentials received from wireless client device 122. The received encoded network credentials may include a code string uniquely associated with a wireless-enabled device. For example, the code string may be associated with a QR code of wireless-enabled device 112. The lookup table may be predetermined and located in storage 220 to associate a code string with network credentials of a wireless local area network. The network credentials of a wireless local area network may include a network identifier (e.g., SSID) and/or a password. For example, encoder/decoder module 222 may look up a received QR code of wireless-enabled device 112 in the lookup table to identify a SSID and a password of a wireless local area network, for example a wireless local area network hosted by wireless-enabled device 112.

Alternatively or in addition, encoder/decoder module 222 may include instructions to detect that the received encoded network credentials is in an encoded format, such as based on metadata and/or an indicator associated with the received encoded network credentials. Encoder/decoder module 222 may include instructions to encode and/or decode the received encoded network credentials from wireless access point 116.

Network configuration manager 226 may include instructions to identify one or more network identifiers (e.g., BSSID), corresponding to one or more wireless access points that a user owns. For example, network configuration manager 226 may include instructions to determine that the user is an owner of wireless access point 116 by comparing the credentials of the user with the credentials of the owners of wireless access point 116.

Network configuration manager 226 may include instructions to provide a user interface that allows network owners to register as an owner of a wireless access point (e.g., wireless access point 116). The user interface may be a graphical user interface with elements representing owners and wireless access points. A network owner may provide identifiers (e.g., MAC address or SSID) of the wireless access point to network configuration manager 226, via for example the user interface. The network owner may provide his user account credentials to network configuration manager 226, such as a user account of a cloud-based service. Network configuration manager 226 may include instructions to associate a wireless access point with its owner by associating an identifier of the wireless access point with the user account credentials of the owner.

Network configuration manager 226 may include instructions to provide a user interface that allows network owners to register as an owner of a wireless device. The wireless device may include a wireless-enabled device and/or a wireless client device. The user interface may be a graphical user interface with elements representing owners and wireless devices. A network owner may provide identifiers (e.g., barcode) of the wireless device to network configuration manager 226. The network owner may provide his user account credentials to network configuration manager 226, such as a user account of a cloud-based service. Network configuration manager 226 may include instructions to associate a wireless device and an owner of the wireless device.

Figure 3:
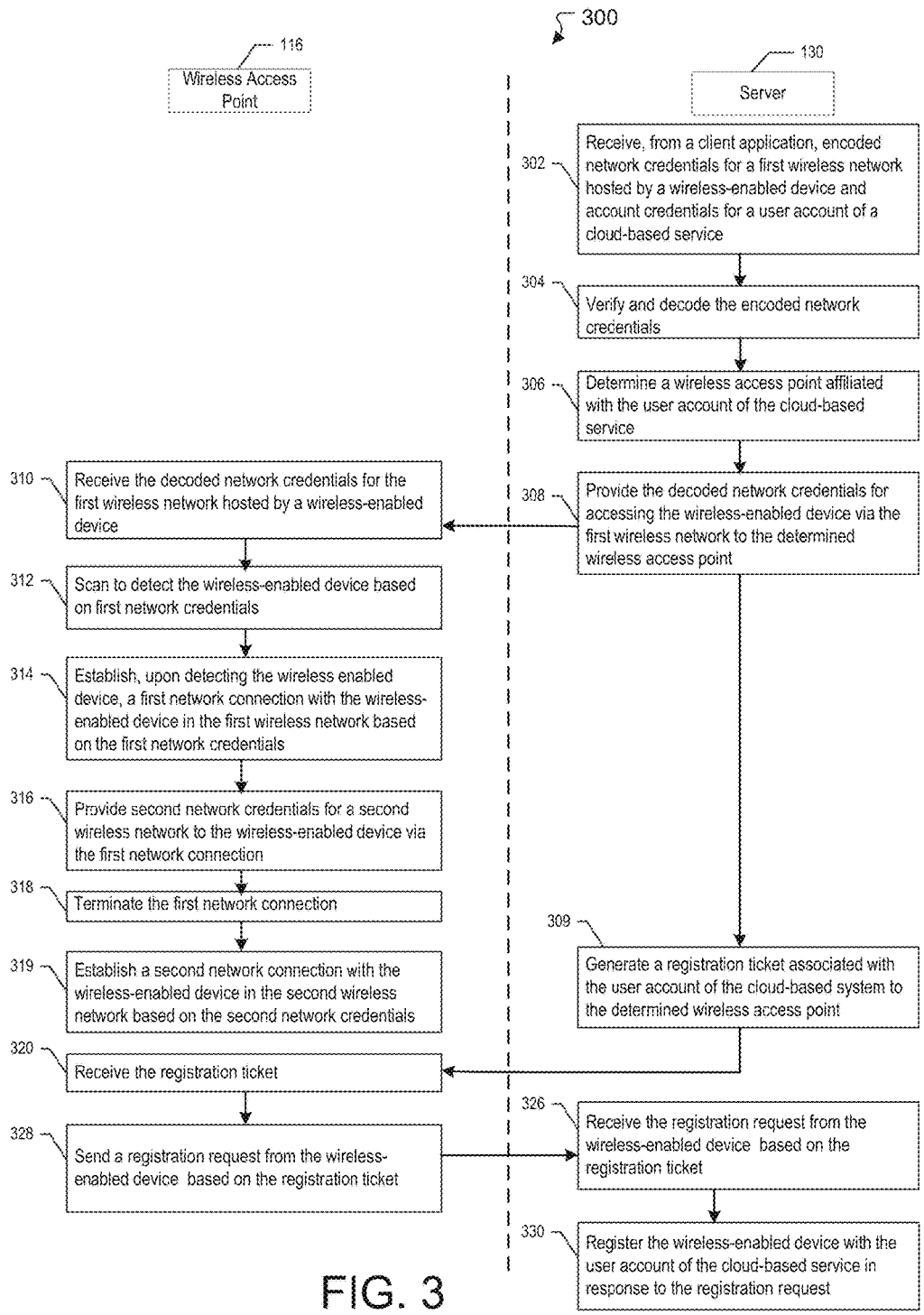
FIG. 3 illustrates a flow diagram of an example process for providing wireless network access.

FIG. 3 illustrates a flow diagram of an example process 300 for providing wireless network access. For explanatory purposes, the example process 300 is primarily described herein with reference to wireless access point 116, and server 130 of FIGS. 1-2; however, the example process 300 is not limited to wireless access point 116 and server 130 of FIGS. 1-2, and the example process 300 may be performed by one or more components of wireless access point 116 and server 130. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

At block 302, server 130 receives encoded network credentials for a first wireless network hosted by a wireless-enabled device (e.g., wireless-enabled device 112) and account credentials for a user account of a cloud-based service from a client application. Wireless-enabled device 112 may broadcast and/or send encoded network credentials of a first wireless network that are detectable by wireless access point 116 and/or wireless client device 122.

The encoded network credentials may include an encoded code string uniquely associated with wireless-enabled device 112. The encoded code string may include a code string encoded with a network identifier (e.g., SSID) and a password of the first wireless network. The encoded code string may be associated with, for example, a QR code, a barcode, and/or any code uniquely associated with wireless-enabled device 112. The encoded network credentials may include an encoded signal transmitted by the wireless-enabled device 112. The encoded signal may include a signal encoded with a network identifier (e.g., SSID) and a password of the first wireless network, for example, unique to the wireless-enabled device 112. The signal may include an audio signal, a wireless signal, and/or any signal uniquely associated with wireless-enabled device 112.

Wireless client device 122 may receive the encoded network credentials from wireless-enabled device 112 via for example, one or more mechanisms described in detail with reference to FIG. 2. The one or more mechanisms may indicate that wireless client device 122 is within a physical proximity with wireless-enabled device 112. Wireless client device 122 may provide the encoded network credentials and forward to server 130, for example, via wireless access point 116.

At block 304, server 130 verifies and decodes the encoded network credentials, for example, to obtain a network identifier and a password of the first wireless network. Server 130 may verify and/or decode the encoded network credentials by encoder/decoder module 222, as described in detail with reference to FIG. 2.

At block 306, server 130 determines a wireless access point affiliated with the user account of the cloud-based service. The determined wireless access point may be wireless access point 116. A user of the user account of the cloud-based service may be determined to be an owner of wireless access point 116, such as by network configuration manager 226 as described in detail with reference to FIG. 2.

At block 308, server 130 provides the decoded network credentials for accessing the wireless-enabled device via the first wireless network to the determined wireless access point, such as wireless access point 116.

At block 310, wireless access point 116 receives the decoded network credentials for the first wireless network hosted by wireless-enabled device 112. At block 312, wireless access point 116 scans to detect wireless-enabled device 112 based on the decoded network credentials, such as a network identifier of the first wireless network hosted by wireless-enabled device 112. Wireless access point 116 may send an error message to server 130 upon failure to detect wireless-enabled device 112. In some aspects, wireless access point 116 is not within a range to detect wireless-enabled device 112. For example, wireless access point 116 is not within a physical proximity with wireless-enabled device 112. Alternatively or in addition, wireless-enabled device 112 may not be within a range to be detected by wireless access point 116. For example, wireless-enabled device 112 may be powered off.

At block 314, wireless access point 116 establishes, upon detecting wireless-enabled device 112, a first network connection with wireless-enabled device 112 in the first wireless network based on the first network credentials. Wireless access point 116 may send, using a first radio system, a connection request to wireless-enabled device 112. Wireless access point 116 may receive, using the first radio system, an authorization message in response to the connection request, the authorization message comprising parameters for the first network connection with wireless-enabled device 112. The first radio system may include one or more first radio-frequency transceivers in wireless access point 116. Wireless access point 116 may be associated with wireless client device 122 while the first network connection is made. Wireless client device 122 may not terminate a wireless network connection when the first network connection is made.

At block 316, wireless access point 116 provides second network credentials for a second wireless network to wireless-enabled device 112 via the first network connection. The second network credentials may include a network identifier and/or a password of the second wireless network hosted by wireless access point 116, for example, including a SSID and a password. At block 318, wireless access point 116 terminates the first network connection after providing the second network credentials.

At block 319, wireless access point 116 establishes a second network connection with wireless-enabled device 112 in the second wireless network based on the second network credentials. Wireless access point 116 may receive, using the first radio system, a connection request from wireless-enabled device 112. The connection request may include the received second network credentials. Alternatively or in addition, wireless access point 116 may receive, using a second radio system, the connection request from wireless-enabled device 112. Wireless access point 116 may send, using the first radio system or second radio system, an authorization message to wireless-enabled device 112 in response to the connection request, the authorization message comprising parameters for the second network connection with wireless-enabled device 112. The second radio system may be different from the first radio system. The second radio system may include one or more second radio-frequency transceivers in wireless access point 116.

At block 309, server 130 generates a registration ticket associated with the user account of the cloud-based system to the wireless access point determined at block 306 (e.g., wireless access point 116). The registration ticket may be generated prior to, later than or at the same, or substantially the same (e.g., within a preset duration), time when block 319 is performed.

At block 320, wireless access point 116 receives the registration ticket. The registration ticket may include registration information associated with the user account of the cloud-based service. Wireless access point 116 may forward the registration information to wireless-enabled device 112.

At block 328, wireless access point 116 receives a registration request from wireless-enabled device 112 based on the registration ticket and sends the registration request to server 130. At block 326, server 130 receives the registration request from wireless-enabled device 112. At block 330, server 130 registers wireless-enabled device 112 with the user account of the cloud-based service in response to the registration request. Alternatively or in addition, wireless access point 116 may register wireless-enabled device 112 with the cloud-based service in association with the user account. Wireless access point 116 may receive, from server 130, an access token associated with the user account. Wireless access point 116 may provide the access token to wireless-enabled device 112.

The present disclosure described herein may offer several advantages for initial setup and configuration of a wireless-enabled device. A wireless client device of a user may not need to terminate its network connection and connect with a provisional network hosted by the wireless-enabled device to setup the wireless-enabled device. Access to a WiFi and/or network application program interface (API) that is not exposed to a wireless client device of the user is not required. The user may not need to be aware of the provisional wireless network hosted by the wireless-enabled device. The user may not need to provide and/or input network identifiers of the wireless local area network to the wireless-enabled device. The user may not need to input a SSID or a password of the wireless-enabled device on the wireless client device.

A wireless access point may provide initial setup and configuration of the wireless-enabled device. The wireless access point may detect the wireless-enabled device and associate with the wireless-enabled device for setup with minimal user interaction. The wireless access point may be modified to be affiliated with a user account of a cloud-based service. The wireless access point may be registered as affiliated with the user account of the cloud-based service at a server.

Figure 4:
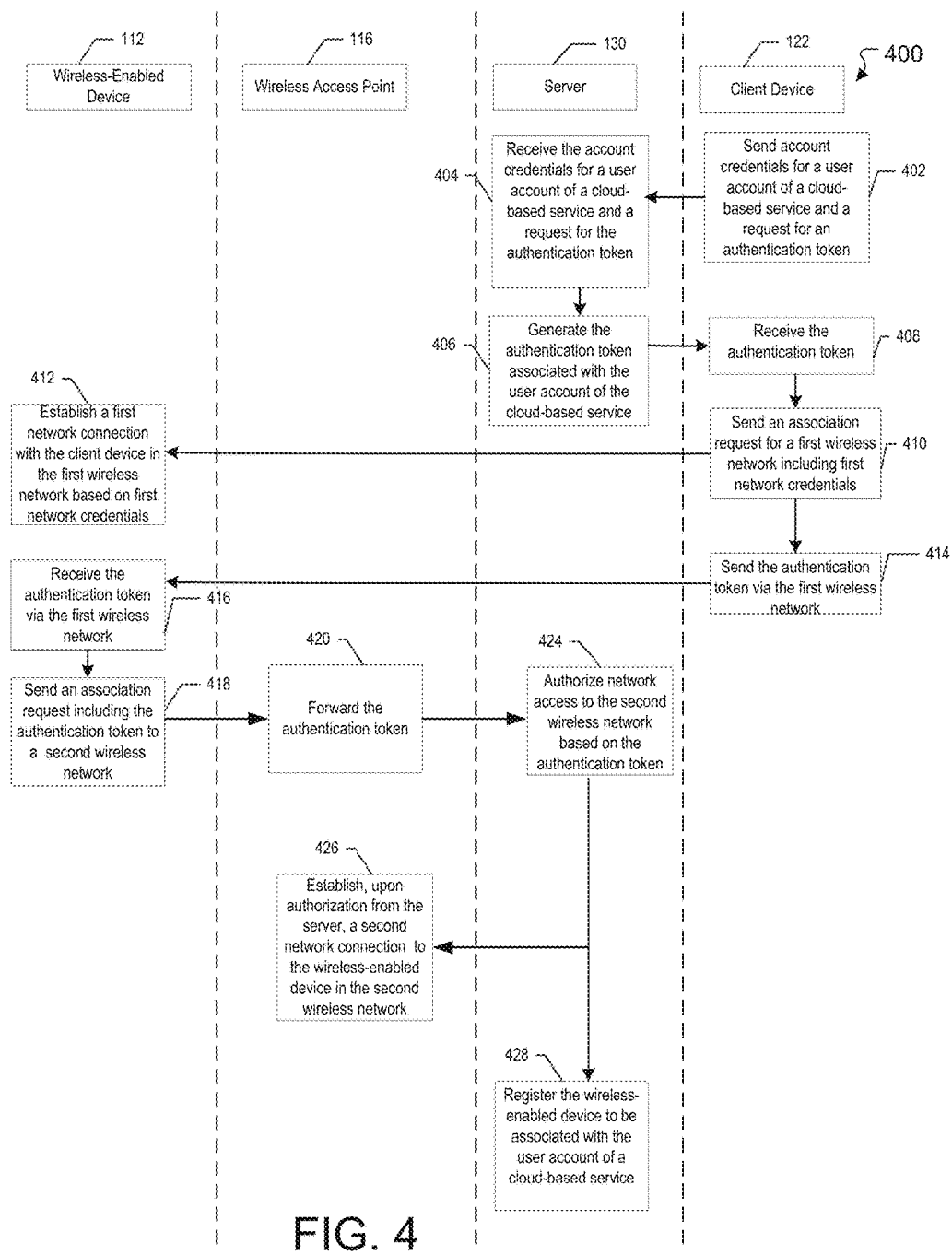
FIG. 4 illustrates a flow diagram of an example process for providing wireless network access.

FIG. 4 illustrates a flow diagram of an example process 400 for providing wireless network access. For explanatory purposes, the example process 400 is primarily described herein with reference to wireless access point 116, wireless client device 122, wireless-enabled device 112, and server 130 of FIGS. 1-2; however, the example process 400 is not limited to wireless access point 116, wireless client device 122, wireless-enabled device 112, and server 130 of FIGS. 1-2, and the example process 400 may be performed by one or more components of wireless access point 116, wireless client device 122, wireless-enabled device 112, and server 130. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

At block 402, wireless client device 122 sends account credentials for a user account of a cloud-based service and a request for an authentication token to server 130. Wireless client device 122 may detect wireless-enabled device 112 based on an advertisement broadcast by wireless-enabled device 112, such as via one or more mechanisms as described with reference to FIG. 2. A user may input a user account of a cloud-based service via a client application as described in details with reference to FIG. 2. The authentication token may be uniquely associated with account credentials for the user account of the cloud-based service to access one or more wireless networks, including, for example, a wireless network hosted by wireless access point 116.

At block 404, server 130 receives the account credentials for a user account of a cloud-based service and a request for the authentication token. Server 130 may support networking protocols including IEEE 802.1x. At block 406, server 130 generates the authentication token associated with the user account of the cloud-based service and sends to wireless client device 122. At block 408, wireless client device 122 receives the authentication token.

At block 410, wireless client device 122 sends an association request for a first wireless network including first network credentials to wireless-enabled device 112. Wireless client device 122 may provide the first network credentials of the first wireless network as described above with reference to FIG. 3. At block 412, wireless-enabled device 112 establishes a first network connection with wireless client device 122 in the first wireless network based on first network credentials. Wireless client device 122 may terminate a current network connection before establishing the first connection. At block 414, wireless client device 122 sends the authentication token via the first wireless network to wireless-enabled device 112. At block 416, wireless-enabled device 112 receives the authentication token via the first wireless network. At block 418, wireless-enabled device 112 sends an association request including the authentication token to wireless access point 116.

The second wireless network may be hosted by wireless access point 116. Wireless access point 116 may support wireless local area network (WLAN) standards including IEEE 802.11x. At block 420, wireless access point 116 forwards the authentication token to server 130 for authentication and network access authorization. The authentication token may be associated with IEEE 802.1x credentials for authentication with server 130.

At block 424, server 130 authorizes network access to the second wireless network based on the authentication token. At block 426, wireless access point 116 establishes, upon authorization from server 130, a second network connection to the wireless enabled device in the second wireless network. Wireless client device 122 may terminate the first network connection before establishing the second connection. At block 428, server 130 registers the wireless enabled device to be associated with the user account of a cloud-based service.

The present disclosure described herein may offer several advantages for initial setup and configuration of a wireless-enabled device. The user may not need to input an SSID or password of the wireless-enabled device. A wireless client device of a user may not need to terminate its network connection. Access to a WiFi and/or network API that is not exposed to a wireless client device of the user is not required.

A wireless access point may assist in initial setup and configuration of the wireless-enabled device. The wireless access point may support WLAN standards including IEEE 802.11x. The wireless access point may be associated with an authentication server that supports IEEE 802.1X to perform authentication of wireless client devices.

Figure 5:
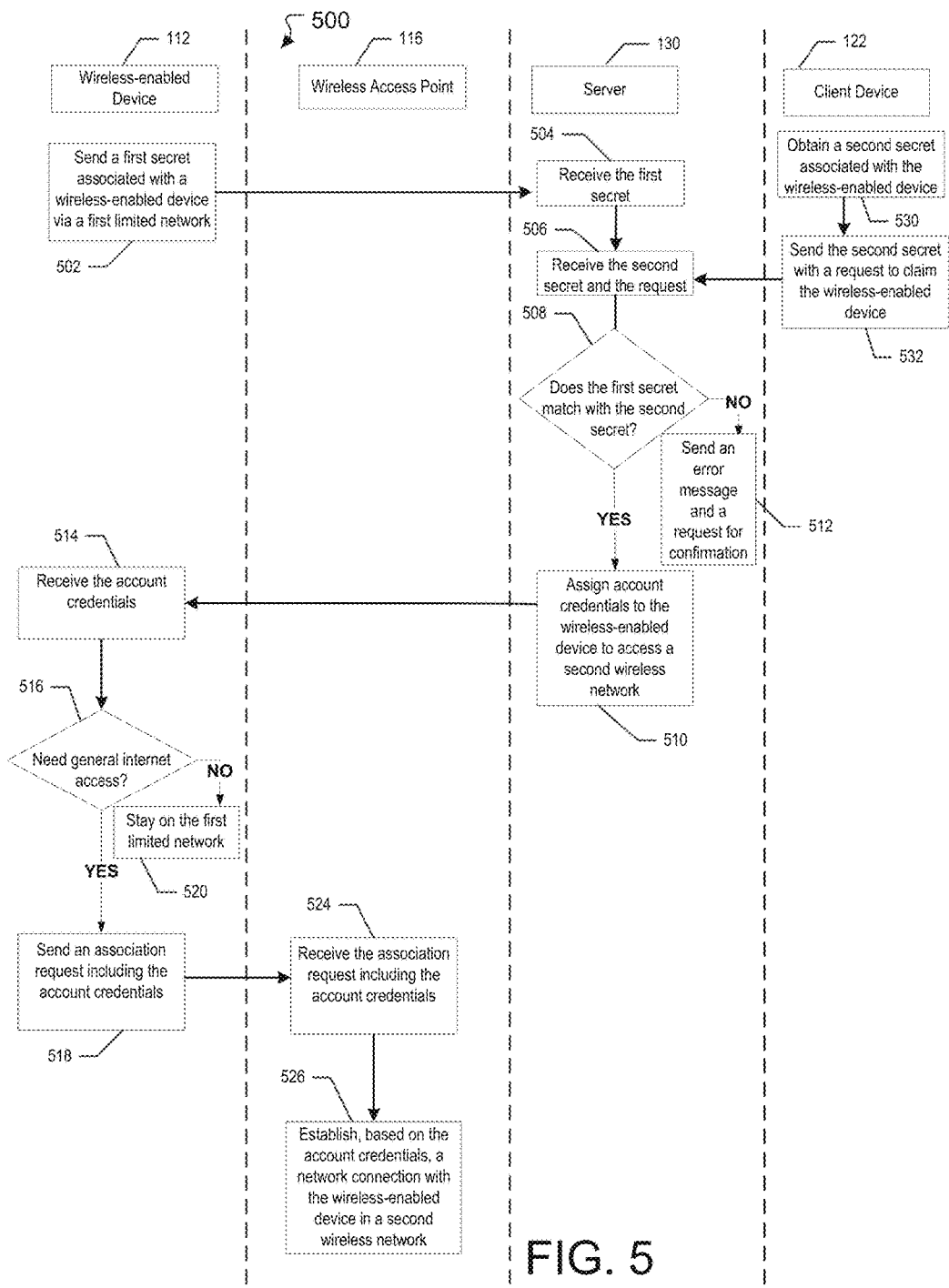
FIG. 5 illustrates a flow diagram of an example process for providing wireless network access.

FIG. 5 illustrates a flow diagram of an example process 500 for providing wireless network access. For explanatory purposes, the example process 500 is primarily described herein with reference to wireless access point 116, wireless client device 122, wireless-enabled device 112, and server 130 of FIGS. 1-2; however, the example process 500 is not limited to wireless access point 116, wireless client device 122, wireless-enabled device 112, and server 130 of FIGS. 1-2, and the example process 500 may be performed by one or more components of wireless access point 116, wireless client device 122, wireless-enabled device 112, and server 130. Further for explanatory purposes, the blocks of the example process 500 are described herein as occurring in serial, or linearly. However, multiple blocks of the example process 500 may occur in parallel. In addition, the blocks of the example process 500 may be performed a different order than the order shown and/or one or more of the blocks of the example process 500 may not be performed.

At block 502, wireless-enabled device 112 sends a first secret via a first limited network. Wireless-enabled device 112 may send an association request to a wireless access point, such as wireless access point 116. The first secret may include encoded network credentials that are unique to wireless-enabled device 112, as described in detail with reference to FIGS. 2-3. Wireless-enabled device 112 may have an authentication token that provides access to the first limited network. The authentication token may be a built-in token in wireless-enabled device 112.

Wireless access point 116 may allow wireless-enabled device 112 to access the first limited network based on the authentication token. The first limited network may provide a limited access only one or more servers, such as server 130. The first limited network may provide a limited access to only a portion of the information on the one or more servers, such as server 130. Wireless access point 116 may provide an open access to one or more servers on a whitelist. The one or more servers may include a whitelisted server and the first limited network may be a rate-limiting network.

At block 504, server 130 receives the first secret from wireless-enabled device 112. At block 530, wireless client device 122 obtains a second secret associated with wireless-enabled device 112. The second secret may be uniquely associated with wireless-enabled device 122 that indicates a physical control and/or proximity, such as encoded network credentials as described with reference to FIGS. 2-3. At block 532, wireless client device sends the second secret with a request to claim wireless-enabled device 112.

At block 506, server 130 receives the second secret and the request to claim wireless-enabled device 112. Block 506 may be performed prior to, later than or at the same, or substantially the same (e.g., within a preset duration), time as block 504. At block 508, server 130 determines if the first secret matches with the second secret. If the first secret matches with the second secret, at block 510, server 130 assigns credentials of a network access account and sends to wireless-enabled device 112 to access a wireless network. The network access account may be a robot account that may be authenticated by server 130 to access the wireless network. Credentials of the network access account may include a network identifier and/or password associated with the wireless network.

If the first secret does not match with the second secret, at block 512, server 130 sends an error message and a request for confirmation to wireless client device 122. At block 514, wireless-enabled device 112 receives the credentials of the network access account from server 130.

At block 516, wireless-enabled device 112 may determine if general internet access is needed. Wireless-enabled device 112 may determine what kind of network access wireless-enabled device 112 needs, such as based on the type of device, type of application running, and/or type of network traffic associated with wireless-enabled device 112. Wireless-enabled device 112 may determine only limited network access is needed for authentication and/or communication with server 130. Wireless-enabled device 112 may determine general network access is needed to access one or more servers other than server 130.

At block 518, if wireless-enabled device 112 needs general internet access, wireless-enabled device 112 sends an association request including the credentials of the network access account received from server 130 to wireless access point 116. At block 520, if wireless-enabled device 112 does not need general internet access, wireless-enabled device 112 stays on the first limited network.

At block 524, wireless access point 116 receives the association request including the credentials of the network access account. At block 526, wireless access point 116 establishes, based on the credentials of the network access account, a network connection with wireless-enabled device 112 in a second wireless network.

The present disclosure described herein may offer several advantages for initial setup and configuration of a wireless-enabled device. A wireless client device of the user may not need to terminate its network connection and connect with a provisional network hosted by the wireless-enabled device. Access to a WiFi and/or network application program interface (API) that is not exposed to a wireless client device of the user is not required. The user may not need to be aware of the provisional wireless network hosted by the wireless-enabled device. The user may not need to provide and/or input network identifiers of the wireless local area network to the wireless-enabled device. The user may not need to input a SSID or a password of the wireless-enabled device on the wireless client device.

A wireless access point may assist in initial setup and configuration of the wireless-enabled device. The wireless access point may support an isolated network where unauthenticated devices are only allowed connection to whitelisted servers. The wireless-enabled device may not need to connect to a local network or the internet for initial setup and configuration. Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
   receiving, by a wireless access point and from a server, first network credentials for a first wireless network hosted by a wireless-enabled device;
   establishing, by the wireless access point, a first network connection between the wireless access point and the wireless-enabled device in the first wireless network based on the first network credentials, by:
      sending a connection request to the wireless-enabled device; and
      receiving an authorization message in response to the connection request, the authorization message comprising parameters for the first network connection with the wireless-enabled device;
   providing, by the wireless access point, second network credentials for a second wireless network to the wireless-enabled device via the first network connection; and establishing, by the wireless access point, a second network connection between the wireless access point and the wireless-enabled device in the second wireless network based on the second network credentials, by:
receiving a connection request from the wireless-enabled device; and
sending an authorization message to the wireless-enabled device in response to the connection request, the authorization message comprising parameters for the second network connection with the wireless-enabled device.

2. The computer-implemented method of claim 1, further comprising:
scanning to detect the wireless-enabled device based on the first network credentials,
wherein the first network connection is established upon detecting the wireless-enabled device.

3. The computer-implemented method of claim 2, further comprising sending an error message to the server upon failure to detect the wireless-enabled device.

4. The computer-implemented method of claim 1, wherein the first network connection is established using a first radio system and the second network connection is established using a second radio system different from the first radio system.

5. The computer-implemented method of claim 1, further comprising:
receiving, from the server, registration information associated with a user account of a cloud-based service; and
forwarding the registration information to the wireless-enabled device.

6. The computer-implemented method of claim 1, further comprising:
registering the wireless-enabled device with the cloud-based service in association with a user account;
receiving, from the server, an access token associated with the user account; and
providing the access token to the wireless-enabled device.

7. The computer-implemented method of claim 1, further comprising terminating the first-network connection with the wireless-enabled device after providing the second network credentials.

8. A wireless network access system comprising:
a first radio system;
a second radio system;
a processor; and
a machine-readable medium encoded with instructions executable by the processor to configure the wireless network access system to:
receive, by a wireless access point and from a server, first network credentials for a first wireless network hosted by a wireless-enabled device;
establish, by the wireless access point, a first network connection between the wireless access point and the wireless-enabled device in the first wireless network based on the first network credentials, by:
sending, using the first radio system, a connection request to the wireless-enabled device; and
receiving, using the first radio system, an authorization message in response to the connection request, the authorization message comprising parameters for the first network connection with the wireless-enabled device;
provide, by the wireless access point, second network credentials for a second wireless network to the wireless-enabled device via the first network connection; and establish, by the wireless access point, a second network connection between the wireless access point and the wireless-enabled device in the second wireless network based on the second network credentials, by:
receiving, using the second radio system, a connection request from the wireless-enabled device; and
sending, using the second radio system, an authorization message to the wireless-enabled device in response to the connection request, the authorization message comprising parameters for the second network connection with the wireless-enabled device.

9. The wireless network access system of claim 8, wherein the first radio system is different from the second radio system.

10. The wireless network access system of claim 8, wherein the instructions are executable by the processor to further configure the wireless network access system to:
receive, from the server, registration information associated with a user account of a cloud-based service; and
forward the registration information to the wireless-enabled device.

11. The wireless network access system of claim 8, wherein the instructions executable by the processor to establish the first network connection further configure the wireless network access system to:
scan to detect the wireless-enabled device based on the first network credentials,
wherein the first network connection is established upon detecting the wireless-enabled device.

12. The wireless network access system of claim 11, wherein the instructions are executable by the processor to further configure the wireless network access system to:
send an error message to the server upon failure to detect the wireless-enabled device.

13. The wireless network access system of claim 8, wherein the instructions are executable by the processor to further configure the wireless network access system to:
register the wireless-enabled device with the cloud-based service in association with a user account;
receive, from the server, an access token associated with the user account; and
provide the access token to the wireless-enabled device.

14. The wireless network access system of claim 8, wherein the instructions are executable by the processor to further configure the wireless network access system to:
terminate the first-network connection with the wireless-enabled device after providing the second network credentials.

15. A non-transitory machine-readable medium encoded with instructions that, when executed by a processor, cause the processor to perform a process comprising:
receiving, by a wireless access point and from a server, first network credentials for a first wireless network hosted by a wireless-enabled device;
establishing, by the wireless access point, a first network connection between the wireless access point and the wireless-enabled device in the first wireless network based on the first network credentials, by:
sending a connection request to the wireless-enabled device; and
receiving an authorization message in response to the connection request, the authorization message comprising parameters for the first network connection with the wireless-enabled device;

providing, by the wireless access point, second network credentials for a second wireless network to the wireless-enabled device via the first network connection; and establishing, by the wireless access point, a second network connection between the wireless access point and the wireless-enabled device in the second wireless network based on the second network credentials, by:
receiving a connection request from the wireless-enabled device; and
sending an authorization message to the wireless-enabled device in response to the connection request, the authorization message comprising parameters for the second network connection with the wireless-enabled device.

16. The non-transitory machine-readable medium of claim 15, wherein the process further comprises:
scanning to detect the wireless-enabled device based on the first network credentials, wherein the first network connection is established upon detecting the wireless-enabled device; and
sending an error message to the server upon failure to detect the wireless-enabled device.

17. The non-transitory machine-readable medium of claim 15, wherein the first network connection is established using a first radio system and the second network connection is established using a second radio system different from the first radio system.

18. The non-transitory machine-readable medium of claim 15, wherein the process further comprises:
receiving, from the server, registration information associated with a user account of a cloud-based service; and
forwarding the registration information to the wireless-enabled device.

19. The non-transitory machine-readable medium of claim 15, wherein the process of establishing the first network connection comprises:
terminating the first-network connection with the wireless-enabled device after providing the second network credentials.

20. A wireless access point device comprising:
a network interface;
a wireless network interface;
a processor; and
a memory comprising instructions executable by the processor to implement a network access manager application that is configured to:
receive, via the network interface and from a cloud-based service, first network credentials for a first wireless network hosted by a wireless-enabled device;
establish a first network connection between the wireless access point device and the wireless-enabled device in the first wireless network based on the first network credentials, by:
sending, using the wireless network interface, a connection request to the wireless-enabled device; and
receiving, using the wireless network interface, an authorization message in response to the connection request, the authorization message comprising parameters for the first network connection with the wireless-enabled device;
provide second network credentials for a second wireless network to the wireless-enabled device via the first network connection; and
establish a second network connection between the wireless access point and the wireless-enabled device in the second wireless network based on the second network credentials, by:
receiving, using the wireless network interface, a connection request from the wireless-enabled device; and
sending, using the wireless network interface, an authorization message to the wireless-enabled device in response to the connection request, the authorization message comprising parameters for the second network connection with the wireless-enabled device.

21. The wireless access point device of claim 20, wherein the network access manager application is configured to:
scan to detect the wireless-enabled device based on the first network credentials,
wherein the first network connection is established upon detecting the wireless-enabled device.

22. The wireless access point device of claim 21, wherein the network access manager application is configured to:
send an error message to the server upon failure to detect the wireless-enabled device.

23. The wireless access point device of claim 20, wherein the network access manager application is configured to:
register the wireless-enabled device with the cloud-based service in association with a user account;
receive, from the cloud-based service, an access token associated with the user account; and
provide the access token to the wireless-enabled device.

24. The wireless access point device of claim 20, wherein the network access manager application is configured to:
terminate the first-network connection with the wireless-enabled device after providing the second network credentials.

25. The wireless access point device of claim 20, wherein the wireless network interface is a Wi-Fi network interface, and wherein the network interface is an Ethernet interface.

* * * * *